United States Patent

[11] 3,570,636

| [72] | Inventors | Maurice F. Franz<br>East Peoria;<br>Le Roy Lichtenstein; Philip S. Webber, Morton; Alexander C. Mc Intosh, Peoria, Ill.; Elmer A. Richards, Kalamazoo, Mich. |
|------|-----------|---|
| [21] | Appl. No. | 801,405 |
| [22] | Filed | Feb. 24, 1969 |
| [45] | Patented | Mar. 16, 1971 |
| [73] | Assignee | Caterpillar Tractor Co.<br>Peoria, Ill. |

[54] PNEUMATIC SHIFT CONTROL FOR A MECHANICAL TRANSMISSION
15 Claims, 13 Drawing Figs.

[52] U.S. Cl. ............................................. 192/3.5,
74/337.5, 74/339, 74/473, 74/740
[51] Int. Cl. ....................................... F16d 67/00,
F16h 3/12
[50] Field of Search .................................... 74/337.5,
335, 340, 339, 740; 192/3.5

[56] References Cited
UNITED STATES PATENTS

| 2,931,237 | 4/1960 | Backus | 74/335 |
|---|---|---|---|
| 2,974,766 | 3/1961 | Perkins et al. | 74/335X |
| 3,078,736 | 2/1963 | Meads et al. | 74/759x |
| 3,348,644 | 10/1967 | Hilpert | 192/3.5X |
| 3,349,635 | 10/1967 | Richards | 74/340X |
| 3,352,392 | 11/1967 | Black et al. | 192/3.5 |
| 3,469,472 | 9/1969 | Bislew | 74/740X |

*Primary Examiner*—Carlton R. Croyle
*Assistant Examiner*—Thomas C. Perry
*Attorney*—Fryer, Tjensvold, Feix, Phillips and Lempio

ABSTRACT: A transmission having both input and output clutches, together with a brake for stopping the change speed gearing to facilitate speed ratio changes is shifted by means of pneumatic actuators under the automatic control of a fluid circuit which is responsive to manual movement of a remotely situated control lever. The control lever is moved along an arc to select a speed range and carries an array of cams along a series of cam operated valves to condition the circuit to operate the appropriate actuators within the transmission in the proper sequence. Sideward movement of the control lever then pneumatically energizes the system to effect the selected shift.

INVENTORS
MAURICE F. FRANZ      ALEXANDER C. McINTOSH
LeROY LICHTENSTEIN    ELMER A. RICHARDS
                      PHILIP S. WEBBER
BY

ATTORNEYS

PNEUMATIC SHIFT CONTROL FOR A MECHANICAL TRANSMISSION

CROSS-REFERENCE TO RELATED APPLICATION

U.S. Pat. application Ser. No. 700,602 of Elmer A. Richards for MECHANICAL DRIVE TRANSMISSION filed Jan. 25, 1968, now Pat. No. 3,508,450, and assigned to the assignee of the present application.

BACKGROUND OF THE INVENTION

This invention relates to vehicle transmissions and more particularly to controls for shifting transmissions.

Transmissions of the kind which have planetary gearings or hydrodynamic components are generally shifted by fluid powered mechanisms with the operator's effort being confined, at most, to the simple movement of a control lever to select a drive range. These power shift transmissions have pronounced advantages such as convenience, minimum wastage of engine power during the shift period and minimum reliance on operator's skill for efficient performance. Mechanical layshaft transmissions of the kind having an input clutch which must be engaged and disengaged by the operator in the course of the shift have lacked these advantages. Such transmissions have mechanical control linkages between the clutch and clutch pedal and the shift lever and transmission and require considerable effort and manipulative skill on the part of the operator. At best, mechanical transmissions involve a substantial loss of engine power during the shift period in that the engine is decoupled, decelerated, and subsequently reaccelerated, during the course of the shift.

Aside from shifting considerations, mechanical transmissions have certain advantages of their own such as greater efficiency under nontransient conditions, low cost, low weight and less bulk, and provide a greater degree of operator control over a vehicle. Thus, there are many advantages to be gained if mechanical transmissions can be provided with the superior shifting performance of hydrodynamic and planetary systems. To some extent, this is best accomplished by restructuring the transmission itself and the above-identified, copending application Ser. No. 700,602 discloses such a modified mechanical transmission.

In the transmission of the copending application, clutches are provided at both the input and output whereby the change speed gears may be completely isolated and stopped during a shift to effect shifting without requiring synchronizers. This also makes it practical to utilize every possible power path through the gears for the purpose of obtaining a very large number of different drive ratios with a minimum of gears. However, such a system requires actuation of more clutches, brakes and shifting forks than does a conventional mechanical transmission. Thus, the problem of providing power shift and of reducing the effort, concentration and skill demanded of the operator is further complicated. Efficient control of this complex of shifting mechanism by an operator, through conventional linkage means including shift levers, clutch pedals and the like, would be very taxing and it is unlikely that optimum shifting efficiency would be realized under most conditions.

SUMMARY OF THE INVENTION

This invention is a fluid-powered control system for reducing the effort, coordination and skill demanded of the operator in shifting a mechanical transmission while providing for optimized efficiency during the shift transient. The operator need only move a shift lever along a predetermined path to select a speed range and then initiates the actual shift by moving the lever a short distance sidewardly. Movement of the lever along the path carries any array of cams along a series of cam operated valves to condition a fluid circuit for operating and sequencing all of the actuators required for the selected shift. The subsequent sideward movement of the lever then energizes the system to perform the particular shift determined by the conditioning of the valves. The shift lever may, if necessary, be remote from the transmission and requires only a small number of fluid conduits therebetween. The fluid circuit includes a variety of safety mechanisms which inhibit certain movement of the shift lever under conditions where the operations represented by the movements would be undesirable and, in a preferred form, includes means which temporarily reapportion the flow of oil to the various components of the transmission during the shift transient to adapt to the different lubrication requirements during that period.

Accordingly, it is an object of this invention to facilitate the shifting of mechanical transmissions and to provide for greater efficiency therein and optimum performance thereof during shift transients.

It is a further object of the invention to provide shift control mechanism for a mechanical transmission having a large number of clutches, brakes, shifting forks, and the like which must be actuated in a predetermined sequence and with precise timing in the course of a shift.

The invention, together with further objects and advantages thereof, will best be understood by reference to the following description of an exemplary embodiment and to the accompanying drawings.

DESCRIPTION OF A PREFERRED EMBODIMENT

Figure 1:
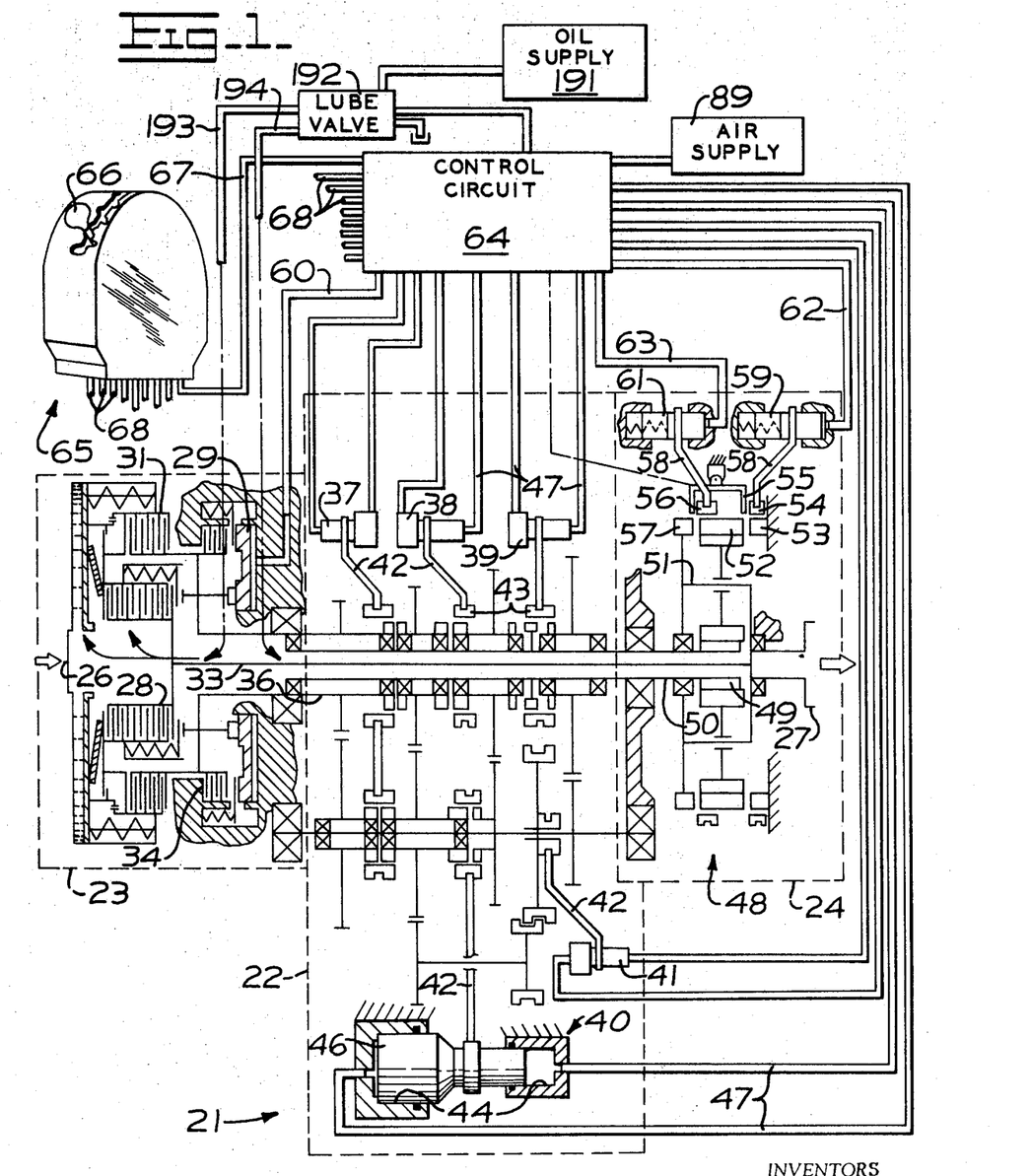
FIG. 1 is a diagrammatic view of a transmission having the invention associated therewith.

Referring now to FIG. 1 of the drawing, the invention will be described with reference to controlling the shifting of a specific transmission 21 of the general type described in detail in the above-identified, copending application Ser. No. 700,602 and accordingly, the principal components of such a transmission are shown in diagrammatic form to facilitate an understanding of the interaction of the present invention therewith.

This particular transmission 21 is designed for use in a truck powered by a diesel engine and provides sixteen forward speeds and two reverse speeds.

The transmission 21 may be considered to have three principal sections including a change speed gear section 22, an input clutch section 23 and an output section 24. As described in detail in the above-identified copending application, input clutch section 23 operates to decouple the change speed gear section 22 from the transmission drive input 26 in preparation for a shift, then brakes the change speed gears to a stop to allow shifting without requiring synchronizers, and subsequently recouples the gears to the input 26 to complete the shift. In order that the change speed gear section 22 may be stopped in this manner, it is also necessary to decouple from the transmission output 27 which connects to the wheel drive line of the vehicle and this function is performed by the output section 24 of the transmission. This particular transmission 21 has an additional feature which provides for substantially uninterrupted drive during the shift period to maintain the load on the engine and to utilize the engine power which would otherwise be wasted at that time. Specifically, during the period that the change speed gear section 22 is disconnected from both the input and output of transmission 21, input clutch section 23 operates still further to connect the output 27 to the input 26 independently of the change speed gears through an additional clutch 28 which is capable of slipping to avoid torque mismatches.

The construction and operation of a transmission 21 of this general type is set forth in detail in the above-identified, copending application and accordingly will not be herein described. However, of particular interest relative to the present invention, are the arrangements by which the several internal elements of the transmission are actuated to effect the above-described operations required for a shift. First, a single air actuated piston 29 in the input clutch section 23 is advanced to disengage the input clutch 31 thereby decoupling the change speed gear section 22 from the engine. This motion of piston 29 also engages the through-drive clutch 28 to transmit drive directly from the input 26 to the output 27 via a through-drive shaft 33 to provide for continuous coupling of the vehicle engine and wheel drive line during the shift transient. Still further, the forward movement of the piston 29 engages a brake 34 coupled to the input 36 of the change speed gear section 22 to brake the change speed gears to a stop as described above. Release of the driving air from behind piston 29 effects a reversed sequence of operations at the conclusion of the shift transient.

After isolation of the change speed gear section 22, the shifting of gear connections therein is effected by operation of appropriate ones of five pneumatic actuators 37, 38, 39, 40 and 41 therein, each such actuator having a shift fork 42 associated therewith for manipulating one of a plurality of jaw clutches 43. Actuator 40 is shown in section to illustrate the internal structure thereof, each of the other actuators 37, 38, 39 and 41 being of the same type. Actuator 40 has a piston 46 with ends of different diameter situated in conforming bores 44 and thus is of the differential type in that if pressurized air is applied to the bores 44 at both ends, the piston and associated shifting fork 42 is moved toward the small diameter end. To operate the several actuators in this manner, air conduits 47 connect with each end of each actuator.

The output section 24 of transmission 21 differs from that of copending application Ser. No. 700,602 by employing a planetary gear set 48 which provides low and high drive ranges in addition to decoupling and recoupling the change speed gear section 22 and the transmission output 27 in the course of a shift. Planetary gear set 48 has a sun gear 49 mounted on the output shaft 50 from the gear section 22 and has a planet carrier 51 coupled to the transmission output 27. The ring gear 52 of the planetary set may be linked to adjacent stationary teeth 53 by a jaw clutch 54 to provide the low drive range, since stopping of the ring gear in this manner forces the planet gears to orbit around sun gear 49 thereby revolving carrier 51 at a reduced rate in the well-known manner. Alternately, ring gear 52 may be locked to the carrier 51 by an additional jaw clutch 56 which is capable of engaging the ring gear with a gear 57 rotatably supported on shaft 50 and coupled to the carrier 51. Engagement of the ring gear 52 and gear 57 in this manner provides a direct drive through the output section or high range since under this condition the planet carrier 51 cannot rotate relative to the ring gear and all gears of the planetary gearing 48, including jaw clutch 56, are constrained to turn with the sun gear 49 and shaft 50. The two drive ranges provided by the output section 24 in combination with the eight-speed ratios available within gear section 22 provides the total of 16 forward speeds. Disengagement of both jaw clutches 54 and 56 provides for decoupling the change speed gear section 22 from the transmission output 27 for the purposes hereinbefore described.

The two jaw clutches 54 and 56 of the output section are operated through shifting forks 58 by an additional pair of pneumatic actuators 59 and 61 respectively which in this instance are of the type which are spring biased to the disengaged positions. Thus, each actuator 59 and 61 requires only a single air conduit 62 and 63 respectively for control purposes. In preparation for a shift, the change speed gears are decoupled from transmission output 27 by exhausting actuators 59 and 61. To guard against shifting when this decoupling has not bee been achieved, due to the line blockage, a chip in the mechanism or other causes, a lever 55 is positioned to sense engagement of either clutch 54 or 56. As shown in FIG. 1, lever 55 has a pair of arms each extending adjacent a separate one of the jaw clutches 54 and 56 so that movement of either clutch towards the engaged position pivots the lever. This pivoting movement of lever 55 operates a safety valve in the control circuit as will hereinafter be discussed in more detail.

Accordingly, shifting of the transmission 21 requires a programmed energizing and deenergizing of the several air operated actuators described above. In particular, a shift is accomplished by first applying air to the piston 29 of input section 23 through a conduit 60 and concurrently releasing air pressure from the actuators 59 and 61 of the output section. This decouples the change speed gear section 22 from both the input 26 and output 27 while establishing a through drive therebetween to maintain the load on the engine. Continued application of air to piston 29 then brakes the change speed gears to a stop. At this point, appropriate ones of the five actuators 37, 38, 39, 40 and 41 of the change speed gear section 22 are pneumatically energized to condition the gears for the desired speed ratio. Subsequently, piston 29 is deenergized to release the change speed gears, to recouple the gearing section 22 to the engine, and to interrupt the through-drive connection between the transmission input and output. Similarly, the appropriate one of the actuators 59 and 61 of the output section 24 is pneumatically energized to recouple the change speed gear section 22 to the output 27 at the desired drive range.

Thus, shifting of the transmission 21 reduces to a matter of supplying air under pressure to certain conduits and releasing air pressure from other others thereof, with a predetermined sequencing and timing. This is effected automatically by a fluid control circuit 64 in response to manipulation of an operator's shift lever 66, which may be remote from the transmission 21 and from the control circuit 64 as well if desired. The only connections between the control circuit 64 and shift lever assembly 65 required for this purpose are a supply conduit 67 for providing air to the shift lever assembly together with eight additional air conduits 68 for transmitting pressure signals back to the control circuit in response to manipulation of the shift lever 66.

Figure 2:
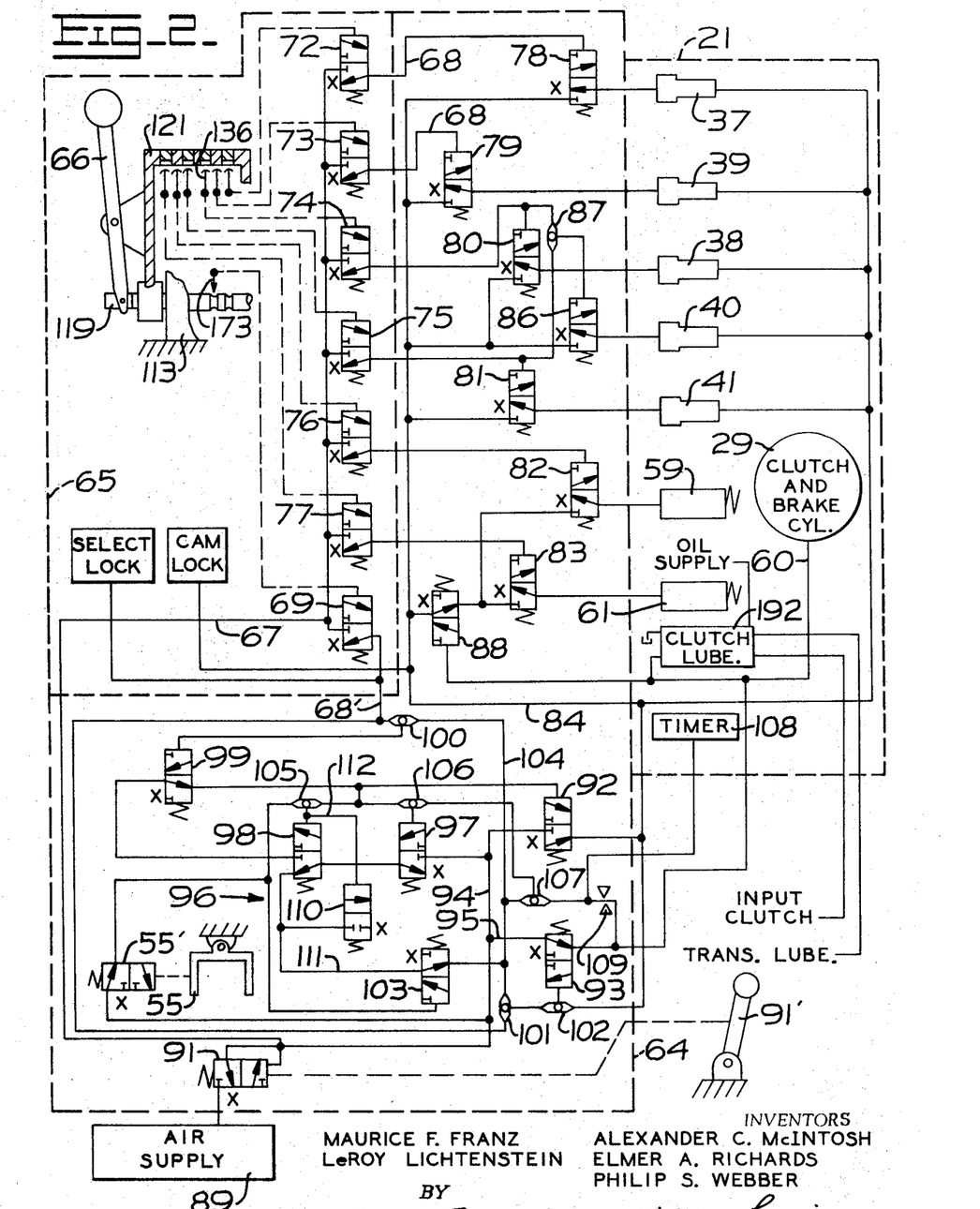
FIG. 2 is a schematic diagram of a pneumatic circuit which controls shifting operations in the transmission of FIG. 1.

Referring now to FIG. 2, the control circuit 64 is shown in diagrammatic form together with certain of the previously described components of the transmission 21 and control lever assembly 65. The previously described piston 29 and actuators 37 to 41, 59 and 61 respond to operation of a shift valve 69 at the shift lever assembly 65 and the particular shift which is made is determined by the condition of six pilot valves 72, 73, 74, 75, 76 and 77 which are also within the shift lever assembly. Through mechanism to be hereinafter described, fore and aft movement of the control lever 66 to any of the 16 forward or two reverse speed settings of the lever operates one or more of the pilot valves 72 to 77 whereby there is a unique combination of operated and unoperated pilot valves for each different shift lever position. (No pilot valves are operated at the neutral setting which is the condition shown in FIG. 2.) A subsequent small sideward movement of the shift lever 66 then operates the shift valve 69, also through mechanisms to be hereinafter described, to begin the actual shift as determined by the conditioning of the pilot valves 72 to 77 at the selected fore and aft setting of the control lever. In the particular transmission herein disclosed, the combinations of pilot valves which are operated (piloted) to condition the system for each of the possible speeds are as follows:

Speed:

| | | |
|---|---|---|
| $R_2$–76–73–75 | 5–76–73 | 12–77–74–72 |
| $R_1$–76–75 | 6–76–73–74 | 13–77–73 |
| N–(none) | 7–76–73–72 | 14–77–73–74 |
| 1–76 | 8–76–73–74–72 | 15–77–73–72 |
| 2–76–74 | 9–77 | 16–77–73–74–72 |
| 3–76–72 | 10–77–74 | |
| 4–76–74–72 | 11–77–72 | |

Each pilot valve 72 to 77 is coupled to a separate one of the signal lines 68 to control circuit 64 and has an unpiloted position at which the associated signal line is vented to atmosphere and a piloted position at which the signal line is communicated with the shift lever assembly line 67.

The signal line 68 from each pilot valve 72 to 77 connects to the pilot inlet of an associated one of six power valves 78 to 83 respectively. Power valves 78 to 83, when piloted, connect actuators 37, 39, 38, 41, 59 and 61 respectively with an actuator air supply line 84 and exhaust the associated actuator when unpiloted. The additional actuator 40 is coupled to supply line 84 through an additional power valve 86 having a pilot coupled to the pilots of both power valves 80 and 81 through a three-way check valve 87 which provides for piloting of valve 86 if either of valves 80 or 81 are piloted. In the case of the differential type actuators 37, 38, 39, 40 and 41 of the change speed gear section, the associated power valves 78 to 81 and 86 are connected between the large diameter end of the actuator and supply line 84. The small diameter ends of such actuators are connected directly to the supply line 84. The two spring biased actuators 59 and 61 of the output section have only a single connection to the supply line 84, through the associated power valves 82 and 83 respectively, and this connection is made through still another valve 88 for purposes to be hereinafter described.

Thus, shifting of the actuators occurs when pressurized air is admitted to line 84 and the direction of operation of each actuator, if any, is determined by the condition of the power valve associated therewith at that time. Since the condition of the power valves 78 to 83 and 86 is in turn determined by the condition of the pilot valves 72 to 77, the admission of pressurized air to line 84 effects the particular shift indicated by the setting of lever 66 at the time line 84 is pressurized.

In conjunction with any such shift, it is also necessary that pressurized air be supplied to the line 60 leading to the input clutch actuator piston 29 at the beginning of the shift and then be released therefrom at the conclusion of the shift. Thus, shifting calls for a release of air pressure from line 84, to ready the several actuators, followed by the application of pressure to the input clutch actuator line 60, followed by the reapplication of pressure to line 84 and the release of the pressure from line 60. Circuit components which accomplish this pressure sequencing, in response to sideward movement of the control lever 66 into a selected gear setting, are shown in the lower portion of FIG. 2.

In particular, the air supply 89 which may be a compressor driven by the vehicle engine or other known means, is connected to the actuator supply line 84 through a safety valve 91 and actuator control valve 92 and connects with the input clutch actuator line 60 through the safety valve 91 and an input clutch actuator control valve 93. Safety valve 91 may be manually controlled by the operator between an open and closed position, by a lever 91' for example, to prevent actuation of the system in the absence of the operator. In the open position, safety valve 91 admits high-pressure air to the lever assembly supply line 67 as well as the lines 94 and 95 to actuator control valves 92 and 93 respectively.

In its unpiloted condition, actuator control valve 92 vents the actuator supply line 84 to atmosphere and this is the condition which obtains when the control lever 66 is placed in its centered or "select" position. Upon being piloted, after movement of the control lever sidewardly into a specific gear setting, control valve 92 repressurizes the actuator supply line 84. Conversely, the input clutch control valve 93 communicates high-pressure air supply line 95 with the clutch actuator line 60 in its unpiloted condition and vents the clutch actuator line upon being piloted. Valve 93 in its unpiloted condition also applies pressurized air to the pilot of the previously described valve 88 which normally communicates power valves 82 and 83 with supply line 84 but vents the two power valves upon being piloted. Valve 88 thus coordinates operation of the output actuator 59 or 61 at the conclusion of a shift with the deenergization of the input clutch actuator 29. This assures that the change speed gearing section actuators 37 to 41 are operated as necessary prior to recoupling to the transmission output.

With actuator control valve 92 in its unpiloted position owing to the action of elements to be hereinafter described which respond to movement of the shift lever 66 to the select position at the fore and aft arc, the several actuators are vented through supply line 84 in preparation for a subsequent shift. The input clutch control valve 93 is piloted at this time and thus the input clutch remains engaged as no pressure is present in actuator line 60.

To effect a shift, control valve 93 must be unpiloted to pressurize line 60 and a predetermined time thereafter, control valve 92 must be piloted to repressurize the actuator supply line 84 to shift the appropriate ones of gearing section actuators 37 to 41. Then, control valve 93 must again be piloted to vent line 60 thereby deenergizing the input clutch actuator 29 and the pilot of valve 88, thereby recoupling the change speed gearing to both the input and output of the transmission. Sequencing of the two actuator control valves 92 and 93 in this manner in response to operation of the shift valve 69 at the control lever assembly is effected by a valve group 96.

Valve group 96 includes a two-position valve 97 having a piloted position at which pressure from line 94 is transmitted to a second valve 98. Valve 98, when piloted, transmits such pressure to still another valve 99 which in its unpiloted condition transmits the pressure on to the pilot of actuator control valve 92 thereby pressurizing the actuator air supply line 84. Valve 99 itself is piloted by pressure from shift valve 69 at the control lever assembly as received through signal line 68' and a three-way check valve 100 which will hereinafter be described in more detail. Thus, when the control lever 66 is moved out of one gear setting into the select position, a pressure signal from line 68' pilots valve 99 which then vents the pilot of actuator control valve 92. Valve 92 then exhausts the actuators 37 to 41, 59 and 61 It should be observed that this does not actually shift the actuators 37 to 41 of the change speed gearing section but merely readies the system for a subsequent shift. Also, this action does not cause the pressurized one of the output actuators 59 and 61 to shift at that time notwithstanding the exhausting of the actuator. The output actuator 59 and 61 is held in its engaged position temporarily by the hereinbefore described planetary gearing clutch, 54 or 56 associated therewith due to the inherent frictional resistance to relative axial movement between two sets of engaged gear teeth when under rotational loading, such clutches resist disengagement as long as a high torque continues to be applied to the associated planetary gearing. Thus, the output actuator 59 or 61 shifts only after the control lever 66 is subsequently moved sidewise into a new gear setting as this action disengages the input clutch and relieves the torque load on the output planetary gearings. In transmissions, such as that of copending application Ser. No. 700,602 which do not employ planetary gears in the output section, other means are employed to avoid decoupling of the change speed gears from the output 27 when the control lever is in the select position.

The select pressure signal from shift valve 69 is also transmitted to the pilot of the input clutch actuator control valve 93 through two additional three-way check valves 101 and 102. Check valve 102 has a connection to actuator supply line 84 and thus, provides for piloting of valve 93 if pressure is received from either signal line 68' or actuator supply line 84. Thus, valve 93 is piloted and, therefore, the input clutch actuator 29 is vented, prior to the time that the shift lever 66 is moved out of its gear setting to the select position inasmuch as actuator supply 84 is pressurized at that time and the valve 93 remains piloted even after venting of the supply line 84 as described above as check valves 101 and 102 immediately shift to continue to provide pilot pressure to the valve from the signal line 68' which is now pressurized. Thus, the input clutch actuator 29, like the actuators 37 to 41, 59 and 61, is not affected by movement of the shift level 66 out of the gear setting and into the select position for movement towards a new gear setting.

The third flow path of each of the above-described check valves 100 and 101 is defined by a conduit 104 which connects to a two-position valve 103 which vents the conduit 104 when in its piloted condition and which communicates the conduit with valve 98 when unpiloted. Valve 98, when piloted, communicates with valve 99 and when unpiloted, couples valve 103 to valve 97 which in turn vents the line from valves 103 and 98 when in its unpiloted condition. The pilot of valve 103 receives pressure from line 94 through a mechanically controlled two position safety valve 55'. Valve 55' is operated by the hereinbefore described lever 55 in the output section of the transmission which senses decoupling of the change speed gears from the transmission output at the start of a shift as previously described. Lever 55 opens valve 55' to allow supply pressure to reach the pilot of valve 103 only if the decoupling within the output section has been successfully effected. If this condition has not been reached, because of some malfunction in the mechanism, valve 55 55' continues to vent the pilot of valve 103 to prevent the attempted shift.

Prior to the time the control lever 66 is moved into the select position, i.e. while the lever is in an initial gear setting, valves 97 and 98 are both a in a piloted condition as the pilots of the two valves are connected through three-way check valves 105 and 106 respectively to the pilot of actuator control valve 92 which is itself pressurized at that time through valves 97, 98 and 99. The additional branch of check valve 105 connects to supply line 94 through safety valve 55' and thereby provides for piloting of valve 98 if either valve 55' is open or valve 92 is piloted.

As discussed above, it is desirable that the several actuators 37 to 41, 59 and 61 remain in their existing condition until after the input clutch actuator 29 has been pressurized. This is brought about in that valve 97 remains unpiloted after movement of the shift lever 66 into the new gear setting as check valve 105 shifts to block pressure from the pilot of valve 97, while piloting valve 98, as described above. In order to pilot valve 97 a predetermined time after the input clutch actuator 29 has been activated and thereby provide for pilot pressure to actuator control valve 92 via valves 98 and 99, the additional branch of check valve 106 communicates with input clutch air supply line 60 through still another three-way check valve 107, a time 108 which may be an accumulator or the like, and a flow orifice 109. The additional branch of three-way check valve 107 connects with the conduit 104 between check valves 100 and 101.

Thus, when input clutch actuator control valve 93 is unpiloted, by movement of the control lever sidewardly from the select position into a particular gear setting, input clutch actuator supply line 60 is pressurized and a pressure signal is transmitted through orifice 109, check valve 107 and check valves 106 to pilot valve 97. This pilots valve 92 are described above to introduce pressure into actuator supply line 84 and thereby initiates operation of the actuators. However, this pressure signal to the pilot of a valve 97 is delayed for a suitable time by the timer 108 to insure that the input clutch 29 has been disengaged. Upon energizing of the actuators 37 to 41, 59 and 61 in this manner, it is then necessary that the input clutch actuator 29 be deenergized to recouple the change speed gearing to the transmission input. This occurs immediately because of the hereinbefore described connection between the pilot of input clutch actuator control valve 93 and actuator supply line 84 through check valve 102 which shifts to pilot valve 93 as the actuators are energized. Such piloting of a valve 93 vents the input clutch actuator supply line 60 and simultaneously unpilots valve 88 to energize the appropriate one of the output section actuators 59 and 61. Thus, at the conclusion of the shift, the change speed gearing is recoupled to both the input and the output of the transmission at a changed speed ratio as determined by the fore and aft position of the control lever 66 at that time.

In order to prevent high pressure air, transmitted through valves 98 and 103 and check valves 107 and 106, from reaching the pilot of valve 97 before it operates to cut off the air supply to valve 98, an additional valve 110 is provided. In the absence of valve 110, the above-described condition would retain pilot pressure at input clutch actuator control valve 93 and not allow the input clutch to cycle. Valve 110 is a two-position valve having an opened and closed post position and is arranged whereby the open position vents the line 111 between valves 98 and 103. Valve 110 is piloted to a closed position by a connection 112 to the pilot of valve 98. Thus, piloting of valve 98 during the initial portion of the shift concurrently vents line 111 avoiding the possible condition described above.

Figure 3:
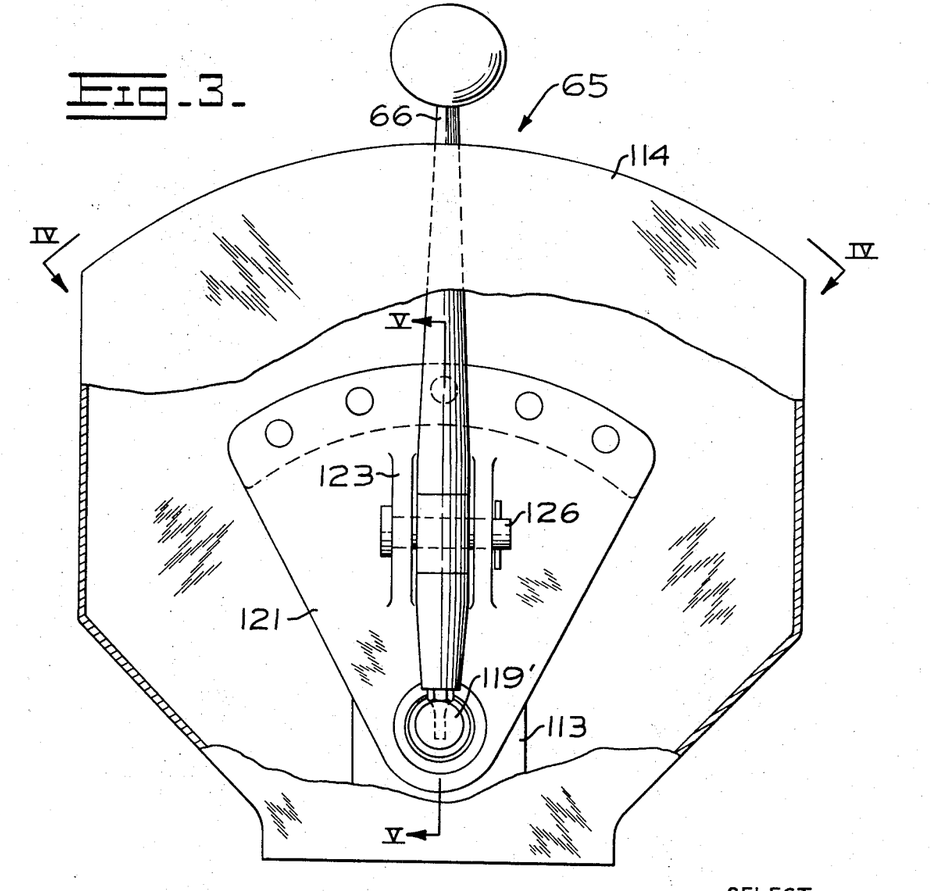
FIG. 3 is a broken-out side elevation view of an operator's shift lever mechanism associated with the system of FIGS. 1 and 2.
Figure 4:
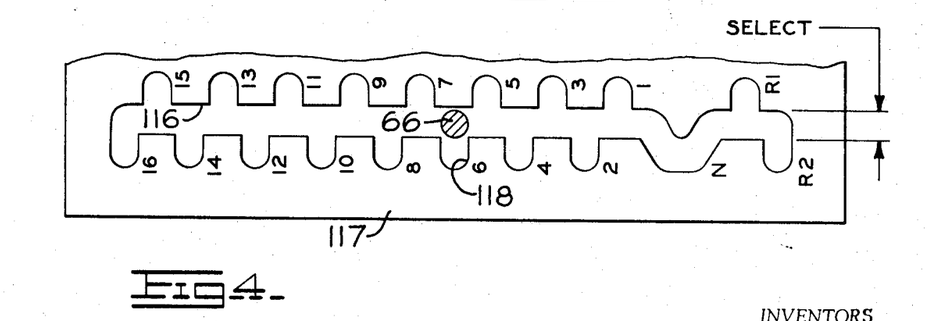
FIG. 4 is a flattened view taken along arcuate line IV-IV of FIG. 3 illustrating the shift pattern of the control lever for changing speed ratios and for changing drive direction.
Figure 5:
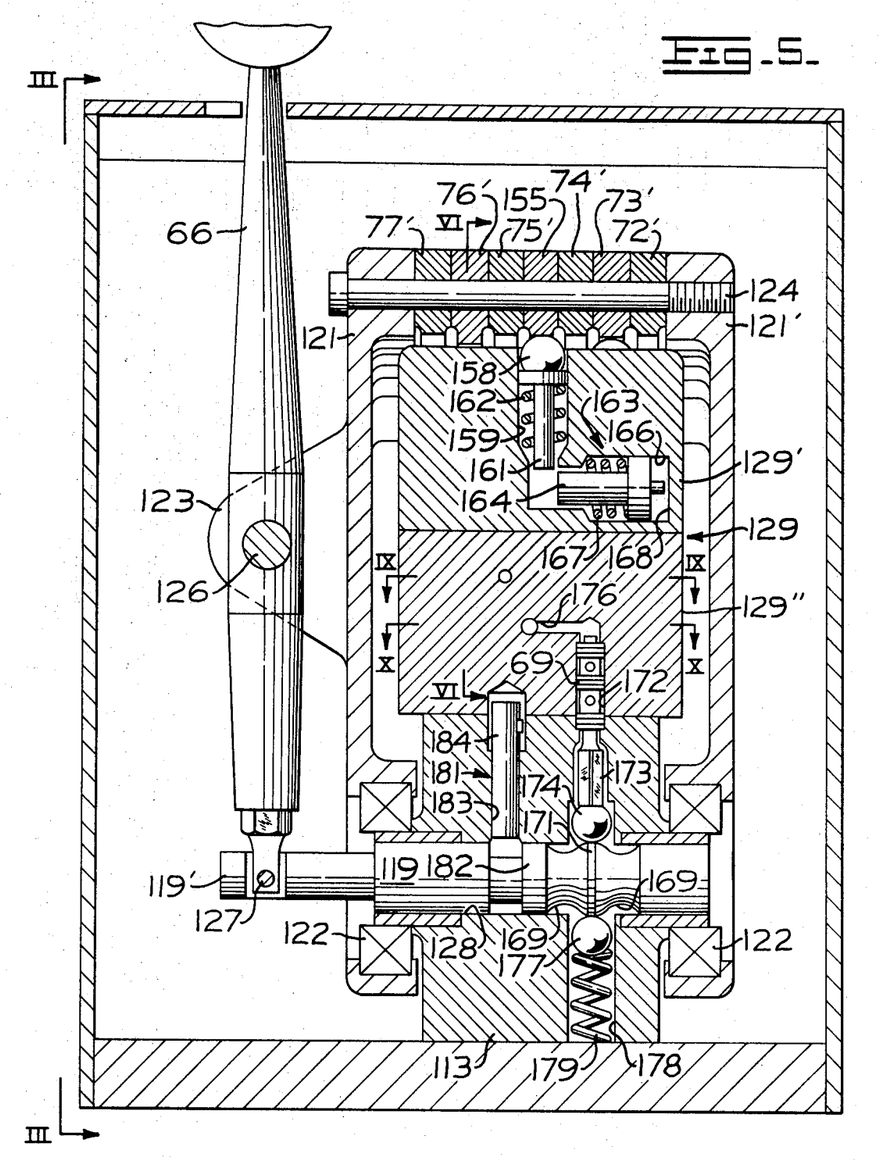
FIG. 5 is a cross section view of the shift lever mechanism taken along line V-V of FIG. 3.

Considering now the mechanical construction of the shift control lever assembly 65, with reference to FIGS. 3 and 4 in conjunction, the lever 66 is supported by a stationary base member 113 which extends into a housing 114. The top of the housing has an arcuate console plate 117 with an opening therein through which the upper end of the control lever 66 protrudes, the opening having a configuration conforming to the hereinbefore described motions of the lever. In particular, the opening is a long arcuate slot 116 conforming to the fore and aft arc of movement of the lever 66 in the select position and with spaced notches 118 distributed along each side thereof in staggered relationship to define the sideward movement of the control lever for each of the several gear settings including the sixteen forward speed settings, the neutral setting and the two reverse settings. Referring now to FIG. 5, control lever 66 is coupled to the fixed base 113 at a spool 119 which transpierces the base and has one end 119' projecting therefrom for coupling to the lower end of the control lever. Spool 119 is rotatable with respect to the base member 113 and thus provides for the desired pivoting movement of control lever 66 along its arc. Referring now to FIGS. 3 and 5 in conjunction, one of a pair of sector shaped cam support plates 121 is disposed at each side of base 113 and is journaled thereto by one of a pair of bearings 122 which are coaxial with spool 119 whereby the cam support plates are free to pivot about the axis of the spool. A pair of spaced ears 123 project outwardly from the cam support plate 121 nearest lever 66 with the lever being received therebetween whereby the cam support plate is constrained to pivot about the axis of spool 119 when the lever is pivoted. The two cam support plates 121 are secured together by bolts 124 which extend therebetween near the arcuate upper edges of the plates and thus both plates move with control lever 66. To provide for the limited freedom of the lever 66 to be pivoted normal to its principal path of travel, the central portion of the lever is pivoted to ears 123 by a transverse pin 126 and the connection between the lower end of the lever and spool projection 119' is similarly made by a pivot pin 127. Thus, control lever 66 may be oscillated about pin 126 and in the process will move spool 119 axially within its bore 128 in base member 113.

Figure 6:
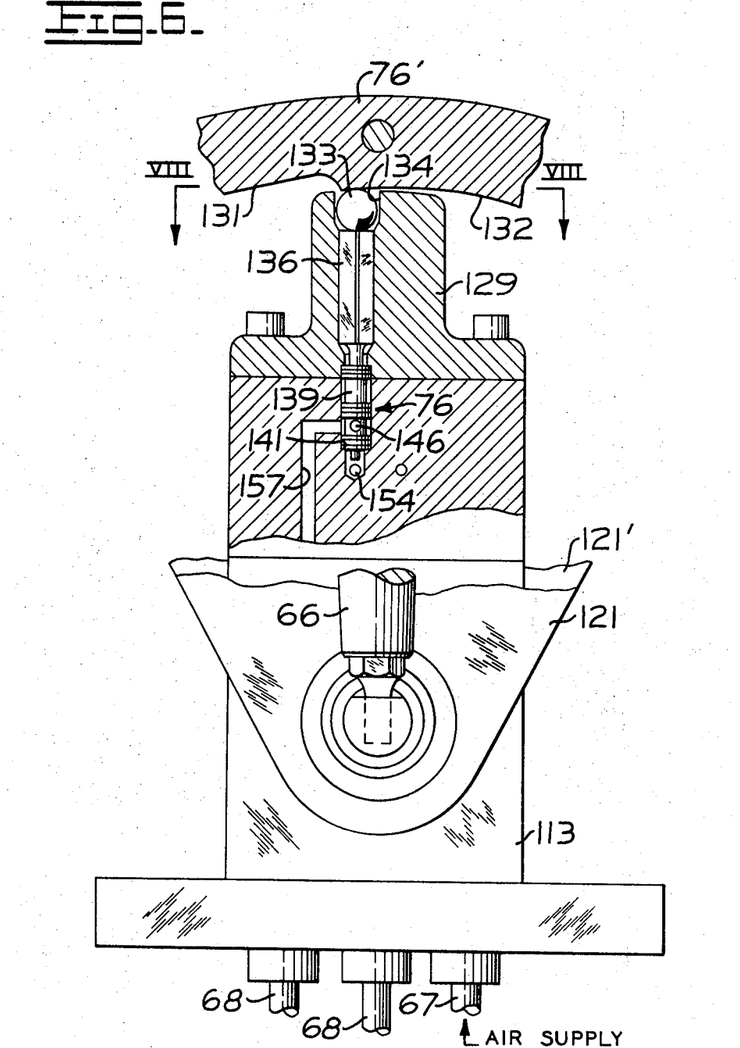
FIG. 6 is still another section view of the shift lever mechanism taken along staggered line VI-VI of FIG. 5.

Referring now to FIGS. 5 and 6 in conjunction, a stationary cam follower body 129 having an upper member 129' and lower member 129'' is secured to base 113 between cam support plates 121 and contains the previously described pilot valves, of which valve 76 appears in FIG. 6. As shown in FIG. 5 in particular, a series of six arcuate cam members 72' to 77' are secured between the upper edges of the two cam support plates 121 by the previously described crossbolts 124 to actuate selected ones of the pilot valves according to the positioning of the control lever 66 along its arc. As illustrated in FIG. 6, the lower surface of each cam has recessed portions 131 at positions where the associated valve is to be unpiloted and downwardly extending portions 132 at those positions where the valve is to be actuated.

Figure 8:
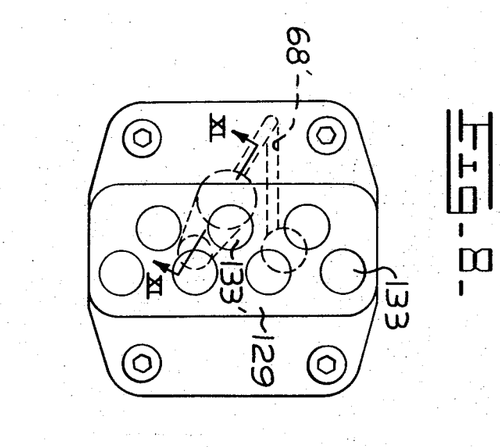
FIG. 8 is a plan view of certain internal components of the shift lever mechanism taken along the line VIII-VIII of FIG. 6.

Below each cam 72' to 77' is a ball 133 situated in the upper portion of an associated one of a series of bores 134 in cam follower member 129. Each ball 133 constitutes a cam follower by bearing against a plunger 136 in bore 134, which operates the associated pilot valve 76, whenever one of the downwardly extending portions 132 of the associated cam is positioned to depress the ball 133. As shown in FIG. 8, the bores 134 and balls 133 may be arranged in two rows as viewed from the top surface of cam follower 129 for greater compactness, with each ball being positioned to be acted upon by a separate one of the cams.

Figure 7:
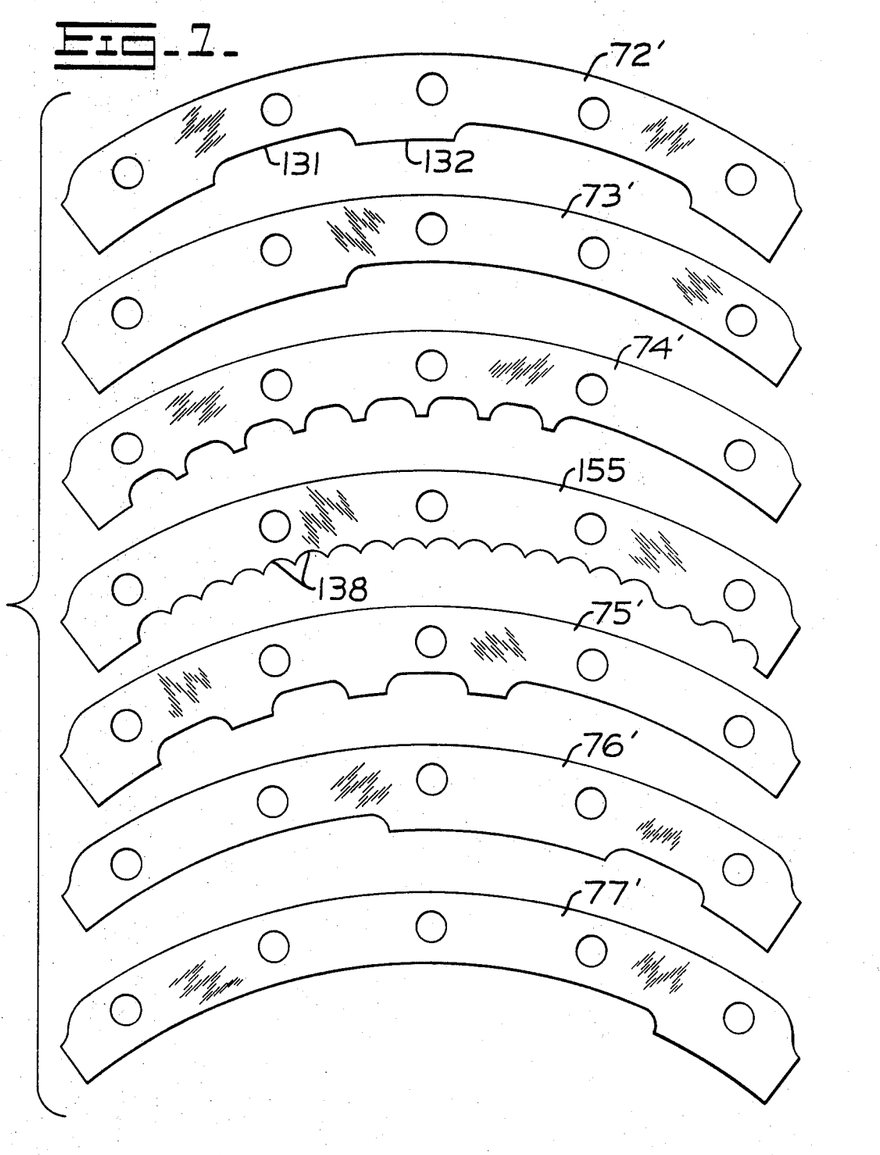
FIG. 7 is a view of a series of cam elements of the shift lever mechanism with the cam elements being shown separated in order to illustrate the structural differences therebetween.

Referring now to FIG. 7, the six cams 72' to 77' are shown separated to illustrate the particular pattern of recessed areas 131 and downwardly extending areas 132 on the underside of each which are needed to effect the specific pilot valve conditioning hereinbefore described as required for shifting of the present transmission. It will be apparent that different cam shapes may be needed for other transmissions which require different combinations of pilot valve actuation at the several speed settings.

Figure 12:
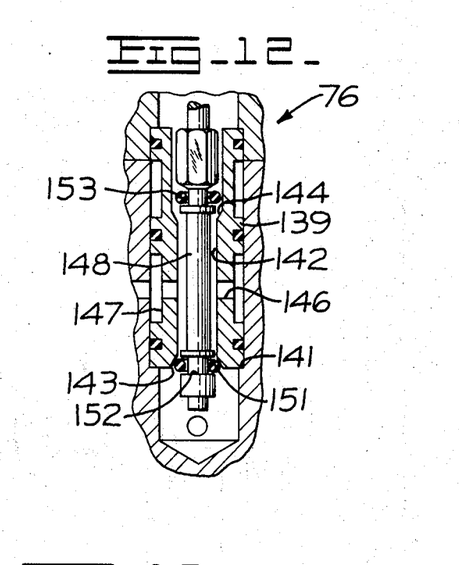
FIG. 12 is an axial section view of a pneumatic signal generating valve of the shift lever mechanism.

Referring now again to FIG. 6, pilot valve 76, which is typical of valves 72 to 77, has a cylindrical casing 139 with the bottom end abutting a shelf 141 near the lower end of the bore 134 of cam follower member 129. As shown in FIG. 12, casing 139 has an axial passage 142 with a first valve seat 143 at the lower end thereof and oppositely facing second valve seat 144 at an intermediate level within the bore. Radial passages 146 in casing 139 are located between the two valve seats 143 and 144 and communicate with a circumferential groove 147 in the exterior surface of the casing. A valve spool 148 extends axially within casing 139 and has a first O-ring 151 situated in a groove 152 near the lower end to engage seat 143 and seal the lower end of bore 142 when the spool 148 is urged upwardly by air pressure. At this position, passages 146 are vented past seat 144. The valve 76 is piloted when the lower end of the plunger 136 exerts a downward force on spool 148 through the previously described cam mechanism. This lowers O-ring 151 from seat 143 and allows air to pass into the casing 139 and out through radial passages 146. To prevent the escape of air in an upward direction at this time, an additional O-ring 153 is carried on the upper part of spool 148 to seat against valve seat 144.

Figure 9:
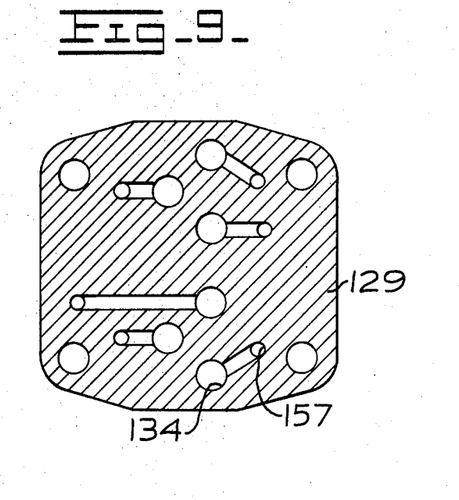
FIG. 9 is a plan section view taken along line IX-IX of FIG. 5.
Figure 10:
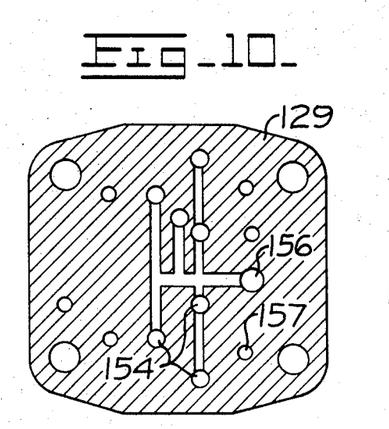
FIG. 10 is a plan section view taken along line X-X of FIG. 5.

Referring again to FIG. 6, the lower end of the bore 134 constitutes the high pressure air input to the pilot valve 76 and is communicated with the previously described air supply conduit 67 by a passage 154 in cam follower member 129. As shown in FIG. 10, the air supply passages 154 to each of the several pilot valves may be at a common horizontal plane within the cam follower member 129 and communicate with a single large passage 156 that leads to the air supply line 67 at the underside of base 113. Referring now to FIGS. 6 and 9 in combination, the radial outlet passage 146 of each pilot valve communicates with a separate one of six passages 157 within the cam follower member 129 that la lead to the associated one of the previously described signal lines 68. Referring now to FIGS. 5 and 7 in combination, it is desirable that the operator be able to sense the several settings of the control lever 66 by touch and also that means be provided which tend to hold the lever at a selected position along its fore and aft arc. Accordingly, an additional cam 155 is situated between cams 74' and 75' and moves therewith to provide for a detent action. A detent ball 158 is situated at the upper end of a bore 159 in upper cam follower body 129' and a plunger 161 therein is acted upon by a coaxial compression spring 162 to urge the ball upwardly towards the underside of the detent cam 155. Cam 155 has a series of notches 138 along the underside at positions corresponding to each control lever setting. Ball 158 tends to enter each notch 138 as the lever is pivoted thereby resisting continued movement of the lever since this requires compression of the spring 162.

The detent is provided with a highly desirable accessory feature in the form of a cam lock assembly 163. This prevents overly rapid movement of the control lever 66 which might tend to shift the several change speed gear actuators before the existing pressure at the actuators has been released in preparation for the subsequent shift. The cam lock 163 is comprised of a second plunger 164 disposed in a horizontal bore 166 which connects at one end with the lower end of the detent bore 159. A compression spring 167 urges plunger 164 away from detent bore 159 and this force is opposed by fluid pressure in the opposite end 168 of bore 166. Bore 166 is communicated with the previously described actuator supply line 84 of the control circuit. Accordingly, plunger 164 is forced under the lower end of detent plunger 161, thereby holding the ball 158 in its upward position and locking the control lever 66 against pivoting movement, until the actuators 37 to 41 are exhausted by movement of the control lever to the select position. When the actuator pressure has dropped sufficiently, plunger 164 is shifted by spring 167 to release the detent 158 and allow control lever movement in the fore and aft direction.

Considering now the mechanical structure of the shift or select valve 69, the spool 119 which is moved axially by sideward movement of control lever 66 has a pair of grooves 169 separated by an annular land 171. Shift valve 69 is of the general type hereinbefore described with reference to FIG. 12 and is situated in a vertical bore 172 above the area of grooves 169 and land 171 of spool 119. Valve 69 is actuated by a plunger 173 which is in turn controlled by a ball 174 in the lower end of bore 172 which rides against the spool 119. Thus, when the spool 119 is shifted to bring land 171 against the ball 174, which is the centered or select position of the control lever 66, the ball is urged upwardly to pilot valve 69 and initiate a select condition in the associated pneumatic circuitry as hereinbefore described. Transverse movement of the control lever 66 to either side of the select position brings one of the grooves 169 into register with ball 174 allowing plunger 173 to drop and restore a valve 69 to its unpiloted condition. Valve 69 receives high-pressure air through a bore 176 communicating the top of bore 172. The signal line 68' to the control circuit communicates with a lower region of the bore 172 as shown in FIG. 8.

To provide a detenting action for the sideward movement of control lever 66, another ball 177 is situated in a vertical bore 178 in base member 113 below spool 119 and a compression spring 179 urges the ball upwardly to bear against the region of the spool 119 around land 171 and grooves 169. Thus, the spring 179 tends to urge ball 177 into either of the grooves 169 to hold the control lever 66 at the selected gear setting.

Figure 11:
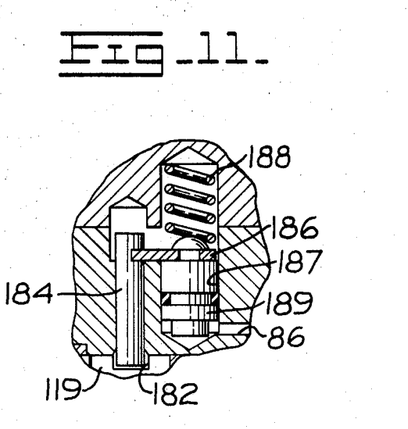
FIG. 11 is a fragmentary section view taken along line XI-XI of FIG. 8 illustrating mechanism which prevents initiation of a shift in the absence of adequate air pressure.

The shift valve 69 mechanism is also provided with a select lock means 181 to prevent movement of the control lever 66 into a specific gear setting before the pneumatic circuit has been conditioned to the select state in preparation for a shift. Premature shifting might otherwise occur under certain conditions, for example, at start-up when the supply pressure is too low to cycle all the pneumatic components rapidly enough. For this purpose, an additional groove 182 is provided in the spool 119 and a vertical bore 183 is situated in base member 113 directly above the groove when the spool and associated control lever 66 is in the centered or select position. A pin 184 is situated in bore 183 for downward movement into spool groove 182 to lock the spool at the centered position in the absence of adequate system pressure. The pin 184 is controlled by mechanism shown in FIG. 11. In particular, a tab 186 extends sidewardly from the upper end of pin 184 into a vertical bore 187 and a compression spring 188 therein acts downwardly on tab 186 to drive the pin 184 down and into the groove 182 of spool 119. A piston 189 is situated in bore 187 below tab 186 to act against the force of spring 188 in response to fluid pressure in the lower end of the bore which pressure is derived from the previously described control circuit activating signal line 68'. Thus, in the presence of adequate pressure in the control circuit, specifically in line 68', tab 186 is forced upwardly against the action of spring 188 pulling the pin 184 from spool 119 and allowing axial movement of the spool from the select position into a specific gear setting.

Referring now again to FIG. 1, the transmission 21 requires lubrication to various moving components and for this purpose, oil from a suitable source 191 is divided by a lubrication valve 192 between two flow paths 193 and 194. Path 193 leads to the input clutch section 23 and path 194 leads to the remainder of the transmission through the center shaft 33 which is hollow. As will be hereinafter described, valve 192 divides the flow between the two paths 193 and 194 in a manner which provides for the optimum division of lubrication between the input clutch section 23 at the front and the more rearward portions of the transmission. However, this optimum division is different under transient and nontransient conditions. In particular, during the shift, it is desirable that a greater proportion of the lubricant flow go to the input clutch section 23 than is required under nontransient conditions. Valve 192 is arranged to effect the desired temporary change in flow division in response to a pressure signal from the control circuit 64.

Figure 13:
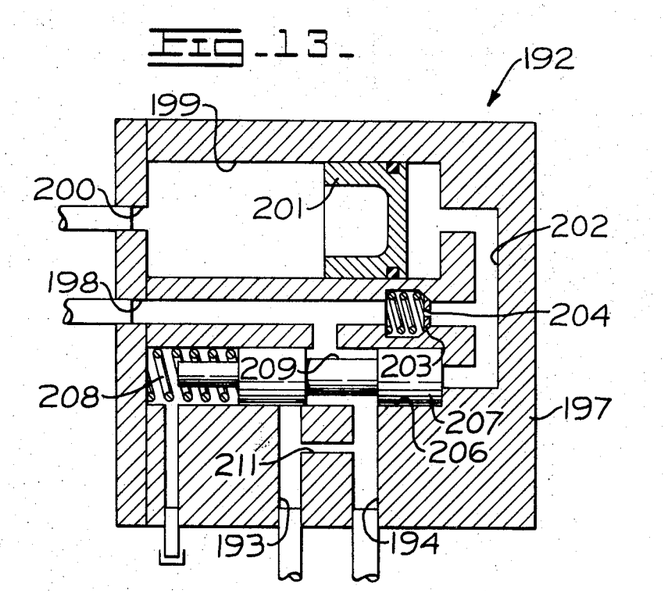
FIG. 13 is a section view of a lubricating oil proportioning valve of the system of FIG. 1.

Referring now to FIG. 13, valve 192 has a body 197 with an oil inlet passage 198 and two outlet passages 193 and 194 leading respectively to the front and back portions of the transmission as described above. An additional, relatively large, bore 199 has one end communicated with the input clutch actuator air line 60 of FIG. 2 in order to receive pressurize air concurrent with the actuation of the input clutch. A piston 201 within bore 199 is responsive to such pressure and also to the oil pressure inasmuch as the opposite end of bore 199 is communicated with oil inlet 198 through a passage 202 and a check valve 203 having an aperture 204 therein. Thus, in the absence of elevated air pressure in bore 199, oil is transmitted through passage 202 and aperture 204 of check valve 203 to move the piston 201 towards the air signal inlet 200.

The oil pressure in passage 202 is also communicated to one end of a bore 206 having a valve spool 207 therein with the force of the oil on one end of the spool being opposed by a compression spring 208 at the opposite end of bore 206. Thus, the in the absence of elevated air pressure in bore 199, the oil pressure in passage 202 acts against the end of spool 207 loading the spool against spring 208. At this position of the spool 207, a groove 209 thereon provides for a passage of oil from inlet 198 to outlet 194 but blocks direct oil flow to passage 193. A passage 211 of relatively small diameter connects passage 194 with passage 193 to deliver a small proportion of the oil to passage 193 for transmission to the input end of the transmission. Typically, under nontransient conditions, 80 percent of the oil flow may go to passage 194 and 20 percent to passage 193. During a shift transient, when air pressure is received in bore 199, piston 201 shifts away from inlet 200 forcing the oil in passage 202 to exert a greater force against the end of spool 207 and thereby shifts the spool against the action of spring 208. This reverses the division of oil flow between passages 193 and 194 in that the spool 207 now closes the direct communication of passage 194 with oil inlet 198 while opening passage 193 thereto. It should be noted that the initial supply of oil to passages 193 and 194 at the beginning of the shift transient includes the oil stored in bore 199 and thus, there is an extra quantity of lubricant available available at the beginning of the shift. It will be apparent that this system for reapportioning the oil flow during the shift transient may be utilized to make other appropriate readjustments of lubrication distribution according to the nature of the specific transmission.

While the invention has been disclosed with respect to a specific embodiment, it will be apparent that many modifications are possible, and it is not intended to limit the invention except as defined in the following claims.

We claim:

1. In combination with a transmission having a change speed gear section (22) with a plurality of fluid operated actuators (37, 38, 39, 41) therein for establishing a plurality of different speed ratios therethrough, a shift control system comprising:
   a source of pressurized fluid (89);
   a plurality of power valves (78 to 81);
   an actuator control valve (92) connected between said pressurized fluid source and said power valves and providing a flow path to each of said actuators through a separate one of said power valves;
   a manual control (66) movable between a plurality of positions each corresponding to a separate one of said speed ratios, said manual control being movable in an additional direction at each of said positions;
   means (72 to 75) responsive to said movement of said control between said positions to operate a unique combination of said power valves at each of said positions; and
   means (96) responsive to said additional movement of said control at any of said positions to operate said actuator control valve whereby said power valves are conditioned to shift a unique combination of said actuators by movement of said control to any of said positions and actual shifting of said actuators occurs only after said additional movement of said control at any of said positions.

2. The combination defined in claim 1 wherein said power valves each have a pilot inlet and are operated by changing the fluid pressure thereat, and wherein said means responsive to movement of said control between said positions thereof comprises a plurality of pilot valves (72 to 75) each being connected to said source of pressurized fluid and to the pilot inlet of a separate one of said power valves and each having a mechanical actuating element (136) positioned for operation by movement of said control to predetermined ones of said positions thereof.

3. The combination defined in claim 1 wherein said means responsive to said additional movement of said control is actuated by fluid pressure signals and further comprising a shift valve (69) connected between said source of pressurized fluid and said means responsive to said additional movement, said shift valve having a mechanical actuating element (173) positioned for operation by said additional movement of said control.

4. The combination defined in claim 1 wherein said actuator control valve has two position positions one of which communicates said flow paths with said source of pressurized fluid and the other of which vents said flow paths, and wherein said means responsive to said additional movement of said control shifts said actuator control valve from a first to a second of said positions in response to said additional movement of said control and shifts said actuator control valve back to said first position in response to opposite movement of said control.

5. The combination defined in claim 4 wherein said means responsive to said additional movement of said control includes a timer (108) delaying said shifting of said actuator control valve from said first to said second position after said additional movement of said control.

6. The combination defined in claim 1 wherein said manual control is a lever pivoted to a support for movement along an arc to said plurality of positions, said lever being further pivoted for movement in a direction normal to the plane defined by said arc at any of said positions to provide for said additional movement.

7. The combination defined in claim 6 wherein said means responsive to movement of said control lever between said positions comprises a plurality of pilot valves (72 to 75) disposed at said support each having a mechanical actuating element (136) and each being operatively coupled to a sea separate one of said power valves, and wherein a plurality of cams (72' to 75') are secured to said control lever for movement along said arc therewith, said cams having raised and recessed portions for operating predetermined ones of said pilot valves through said actuating elements thereof at successive positions along said arc.

8. The combination defined in claim 6 wherein said means responsive to said additional movement is actuated by fluid pressure signals, further comprising a shift valve (69) at said support, said shift valve having a mechanical actuating element (173) and being connected between said source of pressurized fluid and said means responsive to said additional movement; and a spool (119) slidable within said support in a direction normal to the plane defined by said arc and being coupled to said control lever for axial movement thereby upon said additional movement of said lever at any of said positions thereof, said spool having raised and recessed portions for operating said shift valve through said actuating element thereof upon movement of said lever in a direction normal to said arc.

9. The combination defined in claim 1 further comprising a select lock (184) movable between a first position at which said control is prevented from being moved in said additional direction and a second position at which said control is free to be moved in said additional direction and means responsive to the pressure of fluid from said source to shift said select lock from said first to said second position.

10. The combination defined in claim 1 further comprising a cam lock (164) movable between a first position at which travel of said control between said positions is blocked and a second position at which said control is free to travel therebetween, and means (167) for shifting said cam lock from said first to said second position in response to the absence of elevated fluid pressure at said actuators.

11. The combination defined in claim 1 wherein said transmission has a source (191) of lubricating fluid under pressure and has means dividing the lubricating fluid flow therefrom between at least two separate regions of said transmission, wherein said flow dividing means comprises a proportioning valve (192) having an inlet communicated with said source of lubricating fluid and having two outlets each communicating with a separate one of said two regions a of said transmission, said proportioning valve further having a movable member (207) which responds to movement of said control by temporarily altering the distribution of lubricating fluid between said two outlets.

12. In a transmission having a drive input (26) and a drive output (27) together with a change speed gearing section (22) with a plurality of pneumatic actuators (37 to 41) therein for shifting gear connections to provide a plurality of speed ratios therethrough, said transmission having a pneumatically operated input clutch (31) and a pneumatically operated output means (59 and 61) for disengaging said change speed gears from said drive input and drive output respectively and having brake means (34) operative on said gears whereby said gears may be braked and shifted in a substantially stationary condition, a shift control system comprising:

an actuator air supply conduit (84);

a plurality of pneumatically piloted power valves (78, to 82,86) each connecting a separate one of said actuators with said air supply conduit and each having a first position communicating the associated actuator with said air supply conduit and a second position venting the associated actuator;

a source (89) of air under pressure;

a pneumatically piloted actuator control valve (92) connecting said source with said air supply conduit and having a first position communicating said source and said air supply conduit and having a second position venting said conduit;

a pneumatically piloted input clutch control valve (93) connected between said source and said input clutch and having a first position communicating said source and said clutch and a second position venting said clutch;

a control member (66) movable along a predetermined path through a plurality of positions each corresponding to one of said speed ratios, said control member being movable away from said predetermined path at each of said positions;

pilot means (72 to 75) connected to said air source and transmitting pneumatic signals to predetermined ones of said power valves at each of said positions of said control member to shift predetermined ones of said power valves between said first and second positions thereof; and pneumatic control means (96) responding to said movement of said member away from said predetermined path by sequentially shifting said input clutch control valve to said first ps position thereof and then shifting said actuator control valve to first position thereof and shifting said input clutch control valve back to said second position thereof.

13. The combination defined in claim 12 wherein said pneumatic control means responds to movement of said control member back towards said predetermined path by shifting said actuator control valve to said second position thereof while maintaining said input clutch control valve at a said second position thereof.

14. The combination defined in claim 12 where said input clutch control valve has a pilot connected to said actuator air supply conduit whereby shifting of said actuator control valve from said second to said first position thereof shifts said input clutch control valve from said first of said second position thereof the connection between said input clutch control valve pilot and said actuator air supply conduit having a check valve (102) therein whereby said input clutch control valve may be piloted by said pneumatic control means without simultaneously pressurizing said actuator air supply line.

15. The combination defined in claim 12 further comprising a safety valve (55') connected between said source of air and said pneumatic control means, and means (55) sensing engagement of said output means and closing said safety valve in response to engagement of said output men means whereby said actuators may only be shifted by said control system when said change speed gears are disengaged from drive output of said transmission.

PO-1050
(5/69)

UNITED STATES PATENT OFFICE
CERTIFICATE OF CORRECTION

Patent No. 3,570,636     Dated March 16, 1971

Inventor(s) MAURICE F. FRANZ et al

It is certified that error appears in the above-identified patent and that said Letters Patent are hereby corrected as shown below:

Column 7, line 41, delete "55"; line 45 after "both" delete "a".

Column 13, line 5, delete "sea".

Column 14, line, 33 delete "ps".

Column 14, line 57, delete "men".

Signed and sealed this 4th day of January 1972.

(SEAL)
Attest:

EDWARD M. FLETCHER, JR.
Attesting Officer

ROBERT GOTTSCHALK
Acting Commissioner of Pate